US012624165B2

United States Patent

Trivedi et al.

(12) United States Patent
(10) Patent No.: US 12,624,165 B2
(45) Date of Patent: May 12, 2026

(54) POLYETHER KETONE KETONE AND A PROCESS FOR PREPARATION THEREOF

(71) Applicant: Gharda Chemicals Limited, Maharashtra (IN)

(72) Inventors: Prakash D. Trivedi, Maharashtra (IN); Pragnesh D. Damania, Maharashtra (IN); Atul R. Raja, Maharashtra (IN)

(73) Assignee: GHARDA CHEMICALS LIMITED, Maharashtra (IN)

(*) Notice: Subject to any disclaimer, the term of this patent is extended or adjusted under 35 U.S.C. 154(b) by 910 days.

(21) Appl. No.: 17/777,714

(22) PCT Filed: Oct. 7, 2020

(86) PCT No.: PCT/IB2020/059396
§ 371 (c)(1),
(2) Date: May 18, 2022

(87) PCT Pub. No.: WO2021/105784
PCT Pub. Date: Jun. 3, 2021

(65) Prior Publication Data

US 2023/0026150 A1 Jan. 26, 2023

(30) Foreign Application Priority Data

Nov. 27, 2019 (IN) ............................ 201921048492

(51) Int. Cl.
*C08G 65/40* (2006.01)

(52) U.S. Cl.
CPC .................................. *C08G 65/40* (2013.01)

(58) Field of Classification Search
CPC ..................................................... C08G 65/40
USPC ........................................................ 528/223
See application file for complete search history.

(56) References Cited

U.S. PATENT DOCUMENTS 9,683,079 B2 6/2017 Pratte et al.
10,100,144 B2 10/2018 Towle et al.
2016/0102173 A1* 4/2016 Nair ...................... C08G 65/00 528/182
2019/0077739 A1* 3/2019 Jouanneau .............. C07C 45/80
2021/0130557 A1* 5/2021 Brule ...................... C08J 5/249

FOREIGN PATENT DOCUMENTS

WO WO-2007035402 A2 * 3/2007 ............. C08L 71/10
WO WO-2020122365 A1 * 6/2020 ............ C08G 65/48

OTHER PUBLICATIONS

Jeong et al., WO 2020/122365 A1 machine translation in English, Jun. 18, 2020. (Year: 2020).*

(Continued)

*Primary Examiner* — David T Karst
(74) *Attorney, Agent, or Firm* — Panitch Schwarze Belisario & Nadel LLP

(57) ABSTRACT

A polyether ketone ketone (PEKK) has a terephthaloyl: isophthaloyl (T:I) ratio of 100:0. A process for preparing the PEKK is also provided. The process includes polymerizing 1,4-bis (4-phenoxybenzoyl) benzene (EKKE) with terephthaloyl chloride (TPC), and an end capping agent in a fluid medium, to obtain a product mixture including the PEKK. The PEKK is thermally stable and is melt processable on compounding, for injection molding and extrusion.

6 Claims, 1 Drawing Sheet

(56) References Cited

OTHER PUBLICATIONS

Int'l Search Report issued Dec. 14, 2020 in Int'l Application No. PCT/IB2020/059396.
Smith et al, "Spherical, particulate poly(ether ketone ketone) by a Friedel Crafts dispersion polymerisation," RSC Advances, vol. 6, No. 17, pp. 13809-13819 (2016).

* cited by examiner

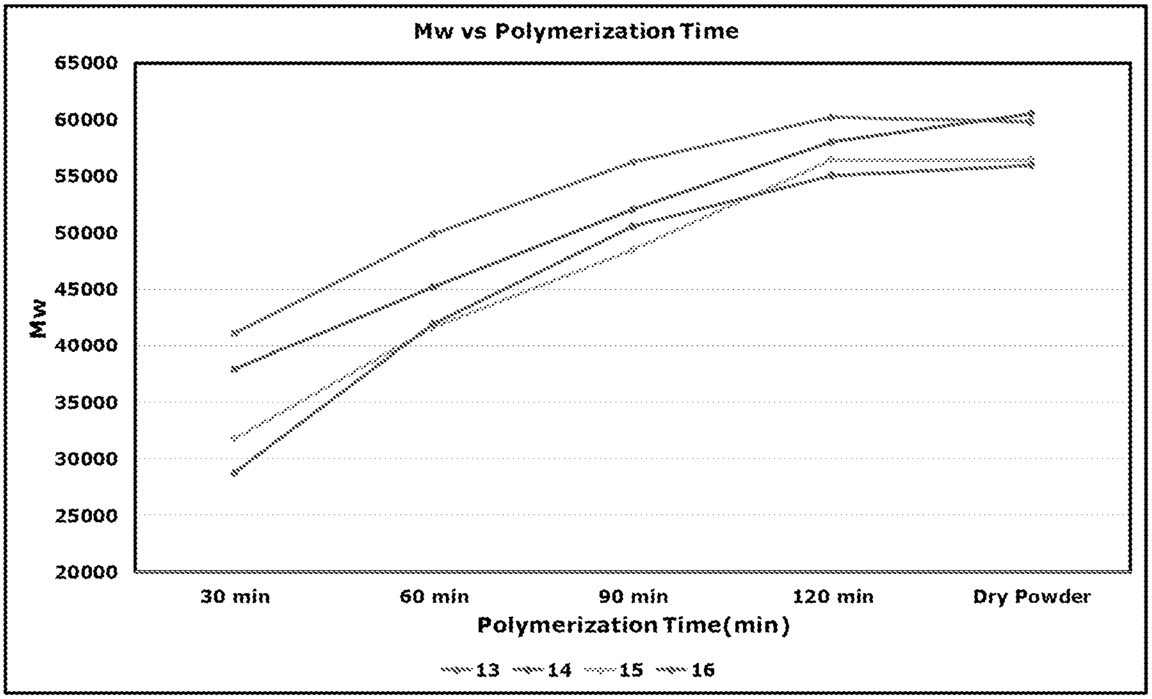
Mw vs Polymerization Time
65000
60000
55000
50000
45000
40000
35000
30000
25000
20000
Mw
30 min
60 min
90 min
120 min
Dry Powder
Polymerization Time(min)
13
14
15
16

POLYETHER KETONE KETONE AND A PROCESS FOR PREPARATION THEREOF

CROSS-REFERENCE TO RELATED APPLICATIONS

This application is a Section 371 of International Application No. PCT/IB2020/059396, filed Oct. 7, 2020, which was published in the English language on Jun. 3, 2021, under International Publication No. WO 2021/105784 A1, which claims priority under 35 U.S.C. § 119 (b) to Indian Application No. 201921048492, filed Nov. 27, 2019, the disclosures of each of which are incorporated herein by reference.

FIELD

The present disclosure relates to a Polyether Ketone Ketone (PEKK) and its process for preparation.

DEFINITIONS

As used in the present disclosure, the following term is generally intended to have the meaning as set forth below, except to the extent that the context in which it is used indicate otherwise.

The term "PEKK" as used herein refers to polyether ketone ketone or poly (ether ketone ketone) or polyether (ketone ketone), which is a semi-crystalline thermoplastic polymer of polyaryletherketone (PAEK) family, having high heat resistance, chemical resistance and the ability to withstand high mechanical loads.

BACKGROUND

The background information herein below relates to the present disclosure but is not necessarily prior art.

In oil and gas industry, nuclear industry and aerospace industry, where materials with higher heat resistance and/or chemical resistance are required, it is not possible to use plastics, and as a result metals are used. However, metals have higher specific gravity and require high energy expenditure to form an article. In general, the specific gravity of thermoplastics is ⅓$^{rd}$ to 1/7$^{th}$ of most metals, and thermoplastics can be converted into an article, having intricate shapes, in one or two steps. Besides, thermoplastics can be recycled easily, as compared to recycling of metals, ceramics or even thermosets.

Poly ether ketone ketones (PEKKs), which is prepared conventionally using ethylene dichloride (EDC) as solvent, exhibit high glass transition temperature ($T_g$) and high melting temperature ($T_m$). $T_m$ of PEKK strongly depends on the ratio between terephthalate (T) isomers, which have para linkages, and isophthalate (I) isomers, which have meta linkages, that is noted as T/I ratio. Presently, poly ether ketone ketones with T:I ratios of 80:20, 70:30 and 60:40 are well-known commercially as high-performance polymers. These PEKKs being semi-crystalline, have a variety of useful properties, such as excellent chemical resistance, electrical insulating and mechanical properties at high temperature, high strength, and toughness and can be used in aeronautics, offshore drilling, and medical/biomedical implants. Further, these polymers may be processed by all the technologies in which thermoplastics are processed, such as injection molding, compression, extrusion, spinning, laser prototyping of filament 3D printing, etc. Polyether ketone ketone polymers may be amorphous or semi-crystalline.

However, prior art does not mention PEKK having T:I ratio of 100:0, and does not disclose any method to improve the melt viscosity, and heat stability of PEKK having T:I ratio of 100:0. It has been reported that 1,4-PEKK can be solution processed using solution in concentrated $H_2SO_4$. However, the problem is that it is highly corrosive and difficult to handle concentrated $H_2SO_4$, as well as the rare possibility of sulfonation of PEKK, thereby destroying its many useful properties, including crystallinity. Further, since the melting temperature of PEKK having T:I ratio of 100:0 is recorded as 389.8° C., it requires a processing temperature of over 400° C., which is undesirable. Hence, PEKKs with T:I ratio of 100:0, that is terephthalate (para linkages) isomers without any isophthalate (meta linkages) isomers, are not commercially produced because they are found to be very unstable, and degrade causing a rapid increase in viscosity at their temperature of processing. Melting point of PEKK with 100% para linkages is close to 395° C., which necessitates a melt processing temperature as high as 410 to 420° C. At such high temperatures, PEKK with T:I 100:0 tends to degrade and gets cross-linked. This makes its melt processing by common plastics processing technologies like injection molding or extrusion nearly impossible. For this reason, PEKK 100:0 is not suitable for industrial applications, which typically require less than 50% change in viscosity over 30 minutes under its processing conditions. This deficiency renders PEKK (with T:I ratio of 100:0) incapable of being used in applications such as medical, general engineering, 3D printing, aerospace, dental implants, etc.

Further, it is necessary to have PEKK in a powder form having controlled morphologies, and also have low content of residual reactants, such as un-reacted solvents, un-reacted monomers, catalyst residues or other reaction components or contaminants, such as volatiles, and content of metals such as Al, Fe and Na, in order to minimize their deleterious effects on PEKK stability and color and their deposition onto the various processing machine parts coming in contact. Such impurities cause melt instability of PEKK during processing at temperatures higher than 400° C. This results in serious problems during molding, extrusion as well as during the preparation of composite materials, as its instability leads to the formation of voids, and property changes like discoloration, etc., during manufacturing itself that impact performance in-use. In addition, good heat stability is sought in order to allow the recyclability of PEKK in their processing.

Despite the advantages of high $T_m$ and $T_g$ for PEKK of ratio T:I 100:0, the issues outlined above have made the large scale production of PEKK with highly pure and melt-stable PEKKs problematic.

There is, therefore, felt a need for PEKK (T:I ratio of 100:0) with a $T_m$ of ~395° C., which has high thermal stability and mechanical properties, and that can be easily compounded and processed, and a process for preparation thereof.

OBJECTS

Some of the objects of the present disclosure, which at least one embodiment herein satisfies, are as follows.

It is an object of the present disclosure to ameliorate one or more problems of prior art and to provide a useful alternative.

Another object of the present disclosure is to provide a PEKK (with a T:I ratio of 100:0), having improved melt stability and melt processibility by extrusion and by injection moulding.

Yet another object of the present disclosure is to provide a melt processible PEKK (with a T:I ratio of 100:0).

Yet another object of the present disclosure is to provide a thermally stable PEKK having a T:I ratio of 100:0.

Yet another object of the present disclosure is to provide a process for preparing a PEKK (with a T:I ratio of 100:0).

Yet another object of the present disclosure is to provide a simple, effective, and environmental friendly process for preparing PEKK (with a T:I ratio of 100:0).

Yet another object of the present disclosure is to provide a process for preparing PEKK (with a T:I ratio of 100:0) of high purity.

Still another object of the present disclosure is to provide an extrudable and injection moldable PEKK (with a T:I ratio of 100:0).

Other objects and advantages of the present disclosure will be more apparent from the following description, which is not intended to limit the scope of the present disclosure.

SUMMARY

In a first aspect, the present disclosure discloses poly ether ketone ketone (PEKK) having terephthaloyl (T):isophthaloyl (I) (T:I ratio) of 100:0, i.e. without isophthaloyl moiety. The PEKK 100:0 is melt processable by extrusion and by injection moulding. The PEKK has:

i. weight average molecular weight in the range of 20,000 to 2,00,000;
ii. thermal stability is in the range of 5 to 50%, measured as change of melt viscosity at 420° C., between 6 and 30 minutes;
iii. <0.2% residual volatiles at 270° C.; and
iv. residual metal content of aluminium is in the range of 0 to 50 ppm, iron is in the range of 0 to 30 ppm.

In accordance with the present disclosure, a solution containing 1 g of PEKK per 100 ml of concentrated sulfuric acid has inherent viscosity of 0.2 to 2.5 dl/g.

In a second aspect, the present disclosure provides a process for preparing poly ether ketone ketone (PEKK) with a terephthaloyl (T):isophthaloyl (I) ratio (T:I ratio) of 100:0, i.e. without isophthaloyl moiety, said process comprises adding a Lewis acid to a mixture of 1,4-bis (4-phenoxybenzoyl) benzene (EKKE) and a first fluid medium, under stirring, and allowing the resultant mixture to exothermically warm to a temperature in the range of 25° C. to 50° C., to obtain a first slurry, which is stirred at a temperature in the range of 25 to 50° C., for a time period in the range of 0.1 hour to 2 hours. EKKE is then polymerized with terephthaloyl chloride (TPC), by adding to the stirred first slurry a predetermined amount of terephthaloyl chloride (TPC) and a first predetermined amount of at least one end capping agent in a second fluid medium, and stirring the resultant mixture at a temperature in the range of 0° C. to 100° C., for a time period in the range of 0.1 hours to 6 hours, to obtain a second slurry containing a polymer. A second predetermined amount of the end capping agent and a third fluid medium, is then added to the second slurry containing said polymer, at a temperature in the range of 0 and 100° C., and temperature is maintained for a time period in the range of 2 to 5 hours to obtain a product mixture comprising poly ether ketone ketone (PEKK), which is quenched by adding a methanolic mineral acid, and then filtered to obtain crude PEKK solid. The crude PEKK solid is washed several times with the methanolic mineral acid, followed by washing with water and a fourth fluid medium to obtain a wet PEKK. The wet PEKK is dried under reduced pressure at a temperature in the range of 100 to 200° C., to obtain the poly ether ketone ketone (PEKK).

In accordance with the present disclosure, the Lewis acid is selected from the group consisting of aluminium chloride ($AlCl_3$) and aluminium bromide ($AlBr_3$).

In accordance with the present disclosure, the first and second predetermined amount of the end capping agent is in the range of 1 mole % to 14 mole % of the total moles of EKKE.

In accordance with the present disclosure, the end capping agent is selected from the group consisting of p-chlorobenzoyl chloride (PCBC), benzoyl chloride, EKKE, diphenylether (DPE), and their derivatives and a mixture thereof.

In accordance with the present disclosure, the first fluid medium, the second fluid medium, the third fluid medium, and the fourth fluid medium are independently selected from the group consisting of ortho-dichlorobenzene (ODCB), methylene dichloride (DCM), Ethylene dichloride (EDC), monochloro benzene, and a mixture thereof.

In accordance with the present disclosure, the step of polymerization is carried out at a temperature in the range of 20° C. to 80° C.

In accordance with the present disclosure, the polymerization time is in the range of 0.5 hours to 3 hours.

BRIEF DESCRIPTION OF ACCOMPANYING DRAWING

A composition of the present disclosure will now be described with the help of the accompanying drawing, in which:

The FIGURE illustrates the graphical representation of the effect of the polymerization time on the molecular weight of PEKK in accordance with an embodiment of the present disclosure.

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

In a first aspect, the present disclosure discloses poly ether ketone ketone (PEKK) having terephthaloyl (T):isophthaloyl (I) (T:I ratio) of 100:0, i.e. without isophthaloyl moiety. The PEKK 100:0 is melt processable by extrusion and by injection moulding. The PEKK has:

i. weight average molecular weight in the range of 20,000 to 2,00,000;
ii. thermal stability is in the range of 5 to 50%, measured as change of melt viscosity at 420° C., between 6 and 30 minutes;
iii. <0.2% residual volatiles at 270° C.; and
iv. residual metal content of aluminium in the range of 0 to 50 ppm, Iron in the range of 0 to 30 ppm.

In accordance with the present disclosure, a solution containing 1 g of PEKK per 100 ml of concentrated sulfuric acid has inherent viscosity of 0.2 to 2.5 dl/g.

In a second aspect, the present disclosure provides a process for preparing poly ether ketone ketone (PEKK) with a terephthaloyl chloride (T):isophthaloyl Chloride (I) with ratio (T:I) of 100:0, i.e. without any isophthalic acid chloride added, said process comprises adding a Lewis acid to a mixture of 1,4-bis (4-phenoxybenzoyl) benzene (EKKE) and a first fluid medium, under stirring, and allowing the resultant mixture to exothermically warm to a temperature in the range of 25° C. to 50° C., to obtain a first slurry, which is stirred at a temperature in the range of 25 to 50° C., for a time period in the range of 0.1 hour to 2 hours. 1,4-bis (4-phenoxybenzoyl) benzene is polymerized with terephthaloyl chloride (TPC), by adding to the stirred first slurry, a predetermined amount of terephthaloyl chloride (TPC) and a first predetermined amount of at least one end capping agent in a second fluid medium, and stirring the resultant mixture at a temperature in the range of 0° C. to 100° C., for a time period in the range of 0.1 to 6 hours, to obtain a second slurry containing a polymer. A second predetermined amount of the end capping agent and a third fluid medium, are added to the second slurry, at a temperature in the range of 0 and 100° C. and the temperature is maintained for a time period in the range of 2 to 5 hours to obtain a product mixture comprising poly ether ketone ketone (PEKK), which is quenched by adding a methanolic mineral acid, and then the quenched slurry is filtered to obtain crude PEKK solid. The crude PEKK is washed with the methanolic mineral acid, to remove aluminium chloride, followed by washing with water and a fourth fluid medium to remove oligomers and unreacted monomers to obtain a wet PEKK. The wet PEKK is dried under reduced pressure at a temperature in the range of 100 to 200° C., to obtain the poly ether ketone ketone (PEKK).

The schematic representation of the process is given as below:

Reaction Scheme:

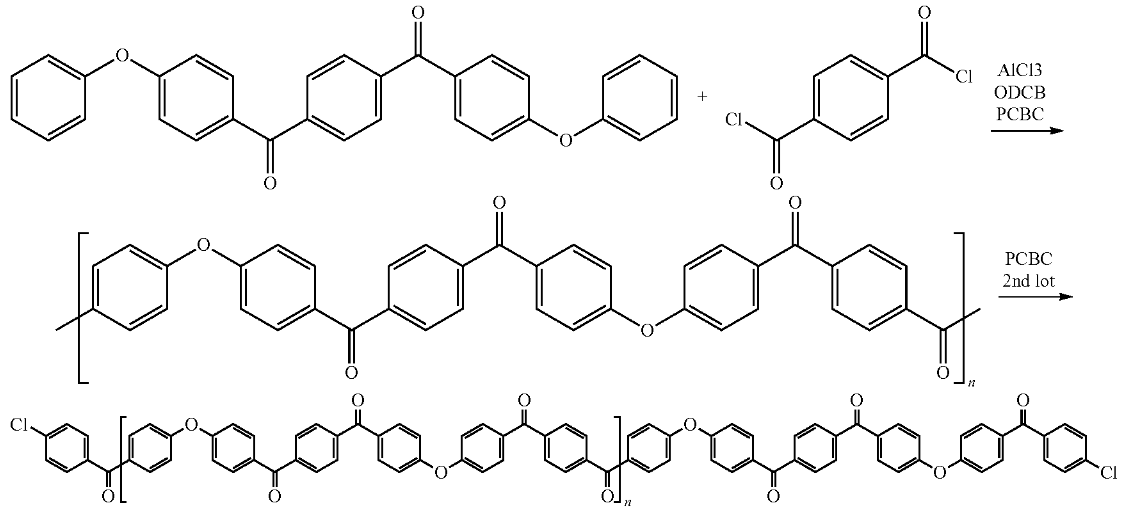

In accordance with the embodiments of the present disclosure, the Lewis acid is selected from the group consisting of aluminium chloride ($AlCl_3$) and aluminium bromide ($AlBr_3$).

In accordance with one embodiment of the present disclosure, the Lewis acid is aluminium chloride ($AlCl_3$).

In accordance with the embodiments of the present disclosure, the first and second predetermined amount of the end capping agent is in the range of 1 mole % to 14 mole % of the total moles of 1,4-bis (4-phenoxybenzoyl) benzene (EKKE).

In accordance with the embodiments of the present disclosure, the end capping agent is selected from the group consisting of p-chlorobenzoyl chloride (PCBC), benzoyl chloride, EKKE, diphenylether (DPE), and their derivatives and a mixture thereof.

In accordance with one embodiment of the present disclosure, the end capping agent is p-chlorobenzoyl chloride (PCBC).

PCBC end caps both the ends of the PEKK polymer, thereby providing a thermally stable structure.

In accordance with the embodiments of the present disclosure, the first fluid medium, the second fluid medium, the third fluid medium, and the fourth fluid medium are independently selected from the group consisting of ortho-dichlorobenzene (ODCB), ethylene dichloride (EDC), methylene dichloride (DCM) and monochloro benzene, nitrobenzene and a mixture thereof.

In accordance with one embodiment of the present disclosure, the first fluid medium, the second fluid medium, the third fluid medium, and the fourth fluid medium is ortho-dichlorobenzene (ODCB).

In accordance with another embodiment of the present disclosure, the first fluid medium, the second fluid medium, the third fluid medium, and the fourth fluid medium is methylene dichloride (DCM).

In accordance with one embodiment of the present disclosure, the step of polymerization is carried out at a temperature in the range of 20° C. to 80° C.

In accordance with one embodiment of the present disclosure, the polymerization time is from 0.5 hours to 3 hours.

In an embodiment, the terephthaloyl chloride (TPC) solution and p-chlorobenzyl chloride (PCBC) solution are separately prepared. TPC solution is prepared by adding a predetermined amount of terephthaloyl chloride (TPC) in ortho-dichlorobenzene (ODCB) and PCBC solution is prepared by adding a predetermined amount of 4-chlorobenzyl chloride (PCBC) in ortho-dichlorobenzene (ODCB). A mixture of TPC and PCBC solutions is prepared by mixing predetermined amounts of separately prepared Terephthaloyl chloride and p-chloro-benzoyl chloride solutions.

PCBC is also added again towards the end of polymerization to ensure complete end-capping at both the chain ends.

The reaction mass after polymerization is then quenched with 1N methanolic dilute Hydrochloric acid to obtain a slurry. The slurry is filtered to separate PEKK solid. The solid PEKK so obtained is washed with methanolic HCl till the polymer is free of aluminium chloride and then with ODCB till free of oligomers and unreacted monomer, if any.

Polymer is subsequently dried in vacuum oven at 150° C. till loss in weight is less than 0.2 wt % at 270° C. The polymer thus obtained is thermally stable and easily processable under standard test conditions.

During wash treatment, the use of fluid media like HCl, MeOH, and acetyl acetone, and the use of chelating agent like EDTA, and distillation of extra solvent results in extra pure polymer having total metal content<80 ppm. (Fe<30 ppm, Al<50 ppm).

The process of the present disclosure is simple and effective. The PEKK obtained by the process of the present disclosure has high purity, and superior thermal and mechanical properties. The molecular weight can be as desired, by manipulating temperature, time and quantity of PCBC added.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following Laboratory experiments have been scaled up to the industrial/commercial scale and the results obtained are in line with lab scale.

EXPERIMENTAL DETAILS

Experiment 1: Preparation of PEKK in Accordance with the Process of the Present Disclosure

Example 1

In a moisture and oxygen free, clean, and dry glass reactor, 2450 ml ODCB was charged at 30° C. 155.1 gms (0.33 moles of 99.99% purity) EKKE monomer was added to the ODCB in the reactor at 30° C. to obtain an admixture. The admixture was stirred for 15 min followed by adding 286 gms of AlCl$_3$ powder to obtain a prereaction mixture. This mixture turns from white slurry to orange red slurry. Due to the exothermicity of the addition of AlCl$_3$, the temperature of the reaction mixture rose to 40° C. The mixture was stirred at 40° C. for up to 1 hour. 62.5 gms TPC and 2.6 gms PCBC in 165 ml ODCB was added in the resultant mixture and stirred for 2 more hours at 40° C. followed by the addition of further 5.5 gms of PCBC and was further stirred for 2 hours at 40° C. to obtain PEKK slurry in ODCB. The reaction mass was then quenched with 2000 ml of 1N methanolic dilute Hydrochloric acid to obtain a slurry. The slurry was filtered to separate PEKK solid. The solid PEKK so obtained was washed with methanolic HCl till the polymer was free of aluminium chloride and then with ODCB till free of oligomers and unreacted monomer, if any. After distilling ODCB over with water, it is taken for drying.

Polymer was subsequently dried in vacuum oven at 150° C. till loss in weight was less than 0.2 wt % at 270° C. The polymer, 184 gms, thus obtained was thermally stable and easily processable under standard test conditions. DSC showed its Tg at 184° C. and Tm at 395° C. on first heating and Tg 172° C. and Tm 395° C. on second heating. It also showed Tc 345° C. on cooling after first heating, thus indicating it to be a highly crystalline material. To measure the thermal and mechanical properties, dry PEKK 100:0 powder so produced, was extruded on twin screw extruder, Coperion ZSK 25 and then granules so obtained were injection molded as per ASTM standard D638, D690 and D256. Moulded test specimens and Pellets were further tested for the thermal and mechanical properties as shown in Table 1.

TABLE 1

| Thermal and Mechanical properties of PEKK with T:I 100:0 | | | |
|---|---|---|---|
| Property | Test Method | Unit | PEKK (T:I/100:0) |
| GPC | ASTM D 6474 | | |
| Mw | | | 107500 |
| Mn | | | 28400 |
| Mwd | | | 3.75 |
| Mechanical Properties | | | |
| Specific Gravity | ASTM D 792 | | 1.3 |
| Tensile Strangth (at break) | ASTM D 638 | MPa | 115 |
| Tensile Modulus | ASTM D 638 | MPa | 4100 |
| Tensile Elongation (at break) | ASTM D 638 | % | 15 |
| Flexural Strength | ASTM D 790 | MPa | 200 |
| Flexural Modulus | ASTM D 790 | MPa | 4000 |
| Impact Strength | ASTM D 256 | J/m | 75 |

DSC Conditions: Heating and cooling Rate: 20° C./min,

TABLE 1-continued

| Thermal and Mechanical properties of PEKK with T:I 100:0 | | | |
|---|---|---|---|
| Property | Test Method | Unit | PEKK (T:I/100:0) |
| Atmosphere: In Nitrogen | | | |
| 1st Heating | ASTM D3418 | | |
| Tg | | ° C. | 184 |
| Tm | | ° C. | 395 |
| ΔHm | | J/g | 39 |
| Cooling Tc | | ° C. | 345 |
| ΔHc | | J/g | (—)48 |
| 2nd Heating | | | |
| Tg | | ° C. | 172 |
| Tm | | ° C. | 395 |
| ΔHm | | J/g | 46 |
| TGA, condition: Heating Rate: 10° C./min, 1 hr at 420° C., in air | | | |
| Weight Loss at 150 ° C. | | % | 0.15 |
| Initial Decomposition Temperature | ASTM E 1131 | ° C. | 585 |
| Melt Viscosity (6 min) | ASTM D4440 | (Pa · s) | 2163 |
| Melt Viscosity (30 min) | | (Pa · s) | 3008 |
| Thermal stability measured as % change between melt viscosity at 6 min and 30 min | | % | 40 |

Further, the change in its melt viscosity (ASTM D4440) at 420° C. between 6 mins and 30 mins using Rheometer DHR 2 at 0.5% strain and 10 rad/Min in parallel plates rheometer is only 40%, i.e. <50%, showing its very high thermal stability at such high temperature. This is what allows it to get extruded on compounding for making granules and for injection molding of granules subsequently.

Examples 2-7: Preparation of PEKK in Accordance with the Process of the Present Disclosure (Varying the Molar Ratio of Endcapping Agent and Polymerization was Carried Out at 75° C.)

Procedure of Example 1, was repeated with varying the % molar ratio of PCBC end-capping agent with respect to the amount of EKKE monomer. The effect of % of mole ratio of total end capping agent on of the examples 2 to 7 were studied and depicted in Table 2. The polymerization reaction of examples 2-7 were carried out at 75° C. instead of 40° C. Molecular weight was measured at the final powder stage using GPC with polystyrene standards. Condition for GPC Mw Measurement: 20 μgm±0.5 powder/pellet in 10 ml volumetric flask+2 ml 4-chloro phenol were heated and heated to 150° C. to get a clear solution. It was then diluted further to 10 ml with TCB+Phenol (1:1 w/w ratio) as mobile phase GPC column temperature was 140° C. Column used was Mix bed B—300 mm×7.5 mm of polystyrene gels.

TABLE 2

| Effect of Total end-capping agent on Mw of PEKK. | | |
|---|---|---|
| Example Number | Endcapping agent mole % of EKKE. | Weight average Molecular weight of PEKK |
| 2 | 2.5 | 113450 |
| 3 | 3 | 105650 |
| 4 | 4 | 91500 |

TABLE 2-continued

| Effect of Total end-capping agent on Mw of PEKK. | | |
|---|---|---|
| Example Number | Endcapping agent mole % of EKKE. | Weight average Molecular weight of PEKK |
| 5 | 5 | 70900 |
| 6 | 6 | 57650 |
| 7 | 7 | 26100 |

It is observed that the molecular weight decreases with increasing molar ratio of PCBC to EKKE, i.e. presence of higher quantity of the end capping agent lowers the molecular weight of PEKK, giving effective control on Mw as desired.

Examples 8-10

Procedure for Example 1 was repeated with varying the % molar ratio of PCBC end-capping agent with respect to the amount of EKKE monomer using 42° C. temperature of polymerization. The effects of % of mole ratio of total end capping agent added, on the Mw of PEKK were studied and depicted in Table 3, with effect of PCBC on Mw as similar to earlier examples.

The polymerization reaction of examples 8-10 were carried out at 42° C. GPC Molecular weight was measured at the final powder stage.

TABLE 3

| The effect of % of mole ratio of the total end capping agent added on Mw of PEKK | | |
|---|---|---|
| Example Number | Endcapping agent mole % | Weight average Molecular weight of PEKK |
| 8 | 3.5 | 67150 |
| 9 | 4.5 | 60150 |
| 10 | 5.5 | 56360 |

Examples 11-12: Preparation of PEKK in Accordance with the Process of the Present Disclosure (End Capping Agent Added in Single Lot and in Two Lots)

Procedure for Example 1 was repeated with varying the pattern of addition of endcapping agent i.e. addition of endcapping agent in two stages vs single stage.

PEKK polymerization batches were performed according to example 1, to study the effect of the addition of end capping agent in two stages vs single stage. (Single stage: charging of end capping agent once vs two stage: charging of end capping agent in two stages during polymerization) Thermal stability of final polymer powder is evaluated at 420° C. using Parallel plate rheometer.

TABLE 4

| Effect of mode of addition on Thermal Stability of PEKK. | | |
|---|---|---|
| | Example Number | |
| | Example 11 | Example 12 |
| Polymerization Temperature ° C. | 40-42 | 40-42 |
| % Mole of End capping agent | 4.5 | 4.5 |
| Addition of End capping agent | One stage | Two stage |

TABLE 4-continued

| Effect of mode of addition on Thermal Stability of PEKK. | | |
|---|---|---|
| | Example Number | |
| | Example 11 | Example 12 |
| Mw | 60000 | 56000 |
| Melt Viscosity (Pa · s) by Parallel plate Rheometer-Time Sweep, ASTM D4440, Strain = 0.5%, Angular Frequency = 10 rad/s, 420° C., Nitrogen Atmosphere, TA-DHR-2 | | |
| Melt Viscosity (6 min) | 529 | 177 |
| Melt Viscosity (30 min) | 1051 | 191 |
| thermal stability measured as % change between melt viscosity at 6 min and 30 min | 99 | 8 |

% Change in melt viscosity is surprisingly higher when all the endcapping agent was added at once (one stage, #11) in the beginning as compared to in two stages (#12). In both the batches, when the end capping agent was added in one stage the difference in melt viscosity of 6 min vs 30 minutes is unacceptably high as compared to the batch done with the end capping agent added in two stages. Difference in melt viscosity indicates that proper end capping is done when the end capping agent is added in two stages vs single stage. The results depicted in Table 4 indicate that complete end capping at both the chain ends is taking place when end-capping agent is added in two lots.

Examples 13-16: Preparation of PEKK in Accordance with the Process of the Present Disclosure (Increase in Molecular Weight with Time)

Procedure for example 1 was repeated to understand the progress of molecular weight against the polymerization time. During the polymerization stage, samples were withdrawn from the reaction mass at an interval of 30 minutes of polymerization and checked for Mw after worked up.

Examples 13 to 16 were performed to understand the progress of Molecular weight against the polymerization time and results are depicted in Table 5 below.

TABLE 5

| Increase in molecular weight of PEKK with time | | | | |
|---|---|---|---|---|
| Polymerization at 42° C. | Example No. | | | |
| Polymerization time (Min) | 13 | 14 | 15 | 16 |
| 30 min | 41100 | 37900 | 31700 | 28700 |
| 60 min | 49830 | 45140 | 41570 | 41900 |
| 90 min | 56150 | 52000 | 48450 | 50550 |
| 120 min | 60150 | 57950 | 56430 | 55000 |
| | After addition of second end capping and work up | | | |
| Dry Powder | 60000 | 58000 | 56000 | 56000 |
| Melt Viscosity (Pa · s) by Parallel pate Rheometer -Time Sweep, ASTM D4440, Strain = 0.5%, Angular Frequency = 10 rad/s, 420° C., Nitrogen Atmosphere, TA-DHR-2 | | | | |
| Melt Viscosity (6 min) (Pa · S) | 149 | 137 | 177 | 210 |
| Melt Viscosity (30 min) (Pa · S) | 197 | 189 | 191 | 304 |
| thermal stability measured as % change between melt viscosity at 6 min and 30 min | 32 | 38 | 8 | 44 |

As the polymerization time increases, the molecular weight also builts up accordingly. But after adding a 2$^{nd}$ lot of the end capping agent (after 120 minutes of polymerization time) the rise in molecular weight almost ceases ensuring complete end capping of the polymer. The polymer dry powder obtained after further 2 hours of maintenance and work up gave almost the same molecular weight as that of 120 minute sample, and hence good purity polymer is obtained, which (for all the batches) has thermal stability in the range of 5 to 50%, measured as % change in Melt viscosity.

The effect of the polymerization time on the molecular weight of PEKK in accordance with an embodiment of the present disclosure is illustrated as graphical representation in the FIGURE.

Comparative Example 1: Preparation of PEKK in Accordance with the Process of the Prior Art (Use of EDC as Solvent and Direct Polymerization Using DPE with TPC)

A 2 liter, 3 necked round bottom flask was equipped with a mechanical stirrer, a nitrogen inlet, condenser and a thermometer. The flask was charged with 20.3 g (0.1 moles) of terephthaloyl chloride, 17.0 g (0.1 mole) of diphenyl ether, 700 ml of 1,2-dichloroethane and 0.07 g of (0.005 moles) of benzoyl chloride. The obtained solution was cooled to less than 10° C. in an ice water bath. Aluminum chloride (34.7 g, 0.26 moles) was added in portions while maintaining the temperature<10° C. Pressure in the reactor is then reduced to 85 mm-120 Hg abs. The temperature is simultaneously increased slowly from 10° C. to 30° C.

Reaction mixture was then maintained at 30° C. for 2 hrs. Subsequently, the reaction mixture was poured into 300 ml of 1N hydrochloric acid. The resulting three phase system was heated to 85° C. to distill 1,2-dichloroethane. The obtained polymer was isolated by filtration, washed twice with 500 ml water and twice with 500 ml methanol. The wet polymer is then dried in a vacuum oven at 100° C. The obtained polymer product showed reduced viscosity of 0.8 dl/g as measured in concentrated sulfuric acid at 25° C. and at a concentration of 1 gm/100 ml.

The final polymer powder obtained using EDC and DPE was compared with powder produced as per the process of the present disclosure in terms of thermal stability. Thermal stability measured using Haake Rheocord. (Table 6)

Haake Mixer Test Parameters:

Temperature: 420° C., Rotor speed: 60 rpm

Mixing Time: 30 min, Weight of Sample: 63 gm

TABLE 6

| Thermal Stability using Haake Rheometer. | | | |
|---|---|---|---|
| Sample Name | Stable after after 6 min (Nm) | Torque after 30 min (Nm) | % change in Torque between 6 and 30 min |
| Comparative Example 1 EDC & DPE | 1.3 | 6.5 | 400 |
| Example - 1 ODCB and EKKE | 6.1 | 10.6 | 73 |

% Change in Torque indicates that PEKK produced using EKKE-TPC with ODCB solvent has better thermal stability (75% change was obtained) as compared to PEKK produced with EDC and DPE-TPC. The stability values obtained using Haake Rheometer is showing higher % change at 420° C. due to the fact that Haake Rheometer is run at high shear values and is also more open to the atmospheric $O_2$ as compared to parallel plate Rheometer.

Thermal stability comparison using Parallel Plate Rheometer—EDC vs ODCB process:

(Table 7)

TABLE 7

Thermal Stability of PEKK using EDC & ODCB.
Time Sweep: Melt Viscosity (Pa · s) by Parallel plate, Rheometer, 25 mm Test Gap = 1 mm, Strain = 0.5%, Angular Frequency = 10 rad/s, Nitrogen Atmosphere, 420° C.

| | | | Expt no 1 (ODCB solvent) | Comparative Example no 1 (EDC solvent) |
|---|---|---|---|---|
| Complex Viscosity after 6 mins | ASTM D4440 | Pa · s | 2163 | 6500 |
| Complex Viscosity after 30 mins | | Pa · s | 3008 | 16280 |
| % Change in complex viscosity (Between 6 mins & 30 mins) | | % | 40 | 150 |

% Change in Melt Viscosity is <50% for PEKK 100:0 produced with ODCB as solvent as well as improved process as compared to conventional EDC process.

Experiments were performed to understand the effect of different washing treatment on the metal content of final powder.

Examples 17-19: Preparation of PEKK in Accordance with the Process of the Present Disclosure (High Purity Polymer—Low Level Metallic Impurity)

Procedure of Example 1 was repeated to understand the effect of a wash treatment to remove metal content of final dried polymer. During wash treatment with fluid media like HCl, MeOH, and acetyl acetone, and use of chelating agent like EDTA, (process NOT given) and distillation of extra solvent resulted in extra pure polymer having total metal content<100 ppm. (Fe<30 ppm and Al<50 ppm).

Examples 17 to 19 were performed, similar to example 1 to understand the progress of effect of washing treatments on the metal content of final powder. The stipulated requirement for pure PEKK is having <30 ppm of Fe and <50 ppm of Al. Metal content data of our examples are depicted in Table 8 below, meeting the purity requirements.

TABLE 8

Metal Contents of PEKK

| | Example Number | | |
|---|---|---|---|
| | 17 | 18 | 19 |
| Metal Content by ICP OES | | | |
| Aluminium (Al) ppm | 37 | 23 | 42 |
| Iron (Fe) ppm | 24 | 21 | 24 |
| Total Metal (ppm) | 61 | 44 | 66 |

Metal content analysis carried out at final powder using ICP OES metal content analysis Instrument.

The metal content data of examples 17 to 19 indicates that polymer is extra pure and has lower level of metallic impurity.

Technical Advancements

The present disclosure described herein above has several technical advantages including, but not limited to, the realization of a simple and effective process for preparing polyether Ketone Ketone (T:I 100:0) having:

melt processable by extrusion and by injection moulding.

weight average molecular weight in the range of 20,000 to 2,00,000;

thermal stability is in the range of 5 to 50% as measured as change of melt viscosity at 420° C., between 6 and 30 minutes;

<0.2% residual volatiles at 270° C.; and residual metal content of aluminium in the range of 0 to 50 ppm, iron in the range of 0 to 30 ppm.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions, and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparing poly ether ketone ketone (PEKK) with a terephthaloyl (T):isophthaloyl (I) ratio (T:I ratio) of 100:0, said process comprising the following steps:

a) adding a Lewis acid to a mixture of 1, 4-bis(4-phenoxybenzoyl) benzene (EKKE) and a first fluid medium, under stirring, and allowing the resultant mixture to exothermically warm to a temperature in the range of 25° C. to 50° C., to obtain a first slurry and stirring said first slurry, for a time period in the range of 0.1 hour to 2 hours;

b) polymerizing EKKE in said first slurry, by adding to said first slurry a predetermined amount of terephthaloyl chloride (TPC) and a first predetermined amount of a mixture of at least one end capping agent in a second fluid medium, and stirring the resultant mixture at a temperature in the range of 0° C. to 100° C., for a time period in the range of 0.1 to 6 hours, to obtain a second slurry containing a polymer;

c) adding a second predetermined amount of a mixture of said end capping agent and a third fluid medium, to said second slurry, at a temperature in the range of 0 to 100° C., and maintaining temperature for a time period in the range of 2 to 5 hours to obtain a product mixture comprising PEKK;

d) quenching said product mixture by adding a methanolic mineral acid, and filtering to obtain crude PEKK solid;

e) washing said crude PEKK solid with the methanolic mineral acid, followed by washing with water and a fourth fluid medium to obtain a wet PEKK; and f) drying said wet PEKK under reduced pressure at a temperature in the range of 100° C. to 200° C., to obtain the PEKK wherein the first and second predetermined amount of said end capping agent is in the range of 1 mole % to 14 mole % of the total moles of EKKE; and wherein a mole ratio of said first predetermined amount of said end capping agent to said second predetermined amount of said end capping agent is about 1:2; and wherein the PEKK has:

i. a weight average molecular weight in a range of 20,000 to 200,000;

ii. thermal stability in a range of 5 to 50%, measured as a change of melt viscosity at 420° C., between 6 and 30 minutes;

iii. <0.2% residual volatiles at 270° C.; and iv. a residual metal content of aluminum in a range of 0 to 50 ppm and iron in a range of 0 to 30 ppm.

2. The process as claimed in claim 1, wherein said Lewis acid is selected from the group consisting of aluminum chloride ($AlCl_3$) and aluminum bromide ($AlBr_3$).

3. The process as claimed in claim 1, wherein said end capping agent is at least one selected from the group consisting of p-chlorobenzoyl chloride (PCBC), benzoyl chloride, EKKE, and their derivatives and mixture thereof.

4. The process as claimed in claim 1, wherein said first fluid medium, said second fluid medium, said third fluid medium, and said fourth fluid medium are independently selected from the group consisting of ortho-dichlorobenzene (ODCB), methylene dichloride (DCM), Ethylene dichloride (EDC), monochloro benzene, and a mixture thereof.

5. The process as claimed in claim 1, wherein the step (b) of polymerization is carried out at a temperature in the range of 20° C. to 80° C.

6. The process as claimed in claim 1, wherein the polymerization time is in the range of 0.5 to 3 hours.

* * * * *